July 4, 1933.  D. E. CARLSON  1,917,094

MOTOR SUSPENSION

Filed April 8, 1933  2 Sheets-Sheet 1

Inventor

David E. Carlson

By Geo. P. Kimmel
Attorney

July 4, 1933.   D. E. CARLSON   1,917,094
MOTOR SUSPENSION
Filed April 8, 1933   2 Sheets-Sheet 2
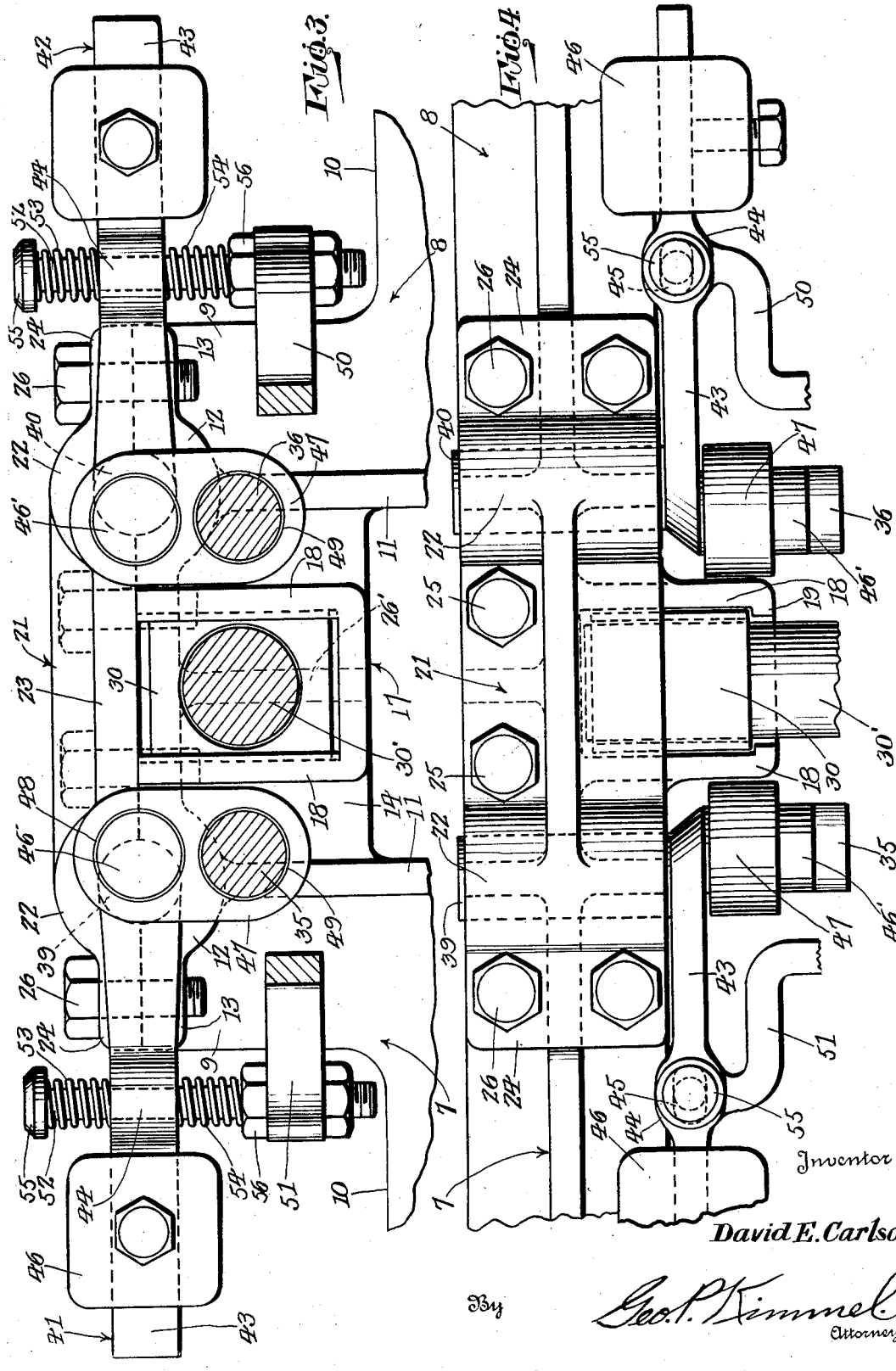
Inventor
David E. Carlson
By Geo. P. Kimmel
Attorney Patented July 4, 1933

1,917,094

UNITED STATES PATENT OFFICE

DAVID E. CARLSON, OF CHICAGO, ILLINOIS

MOTOR SUSPENSION

Application filed April 8, 1933. Serial No. 665,209.

This invention relates to a motor suspension designed primarily for use in connection with motors of automotive vehicles, but it is to be understood that a suspension, in accordance with this invention may be employed in any connection for which it is found applicable, and has for its object to provide, in a manner as hereinafter set forth, a motor suspension for eliminating power shock and vibration to vehicles during the operation of the motor when the vehicle is traveling, during the operation of the motor when the vehicle is standing still, as well as to overcome a jar or shock applied to the crank and drive shafts of the vehicle when placing the motor in operation.

Further objects of the invention are to provide, in a manner as hereinafter set forth, a combined spring controlled, weighted counterbalanced and slidable means for suspending a motor for the purpose referred to and which is comparatively simple in its construction and arrangement, strong, durable, compact, thoroughly efficient for the purpose intended, readily installed with respect to the motor and comparatively inexpensive to set up.

To the above ends essentially and to others which may hereinafter be set forth, the invention consists of such parts, and such combination of parts which fall within the scope of the invention as claimed.

In the drawings:

Figure 3 is a section on line 3—3 Figure 1.

Figure 4 is a top plan view of the structure shown in Figure 3.

Figure 1:
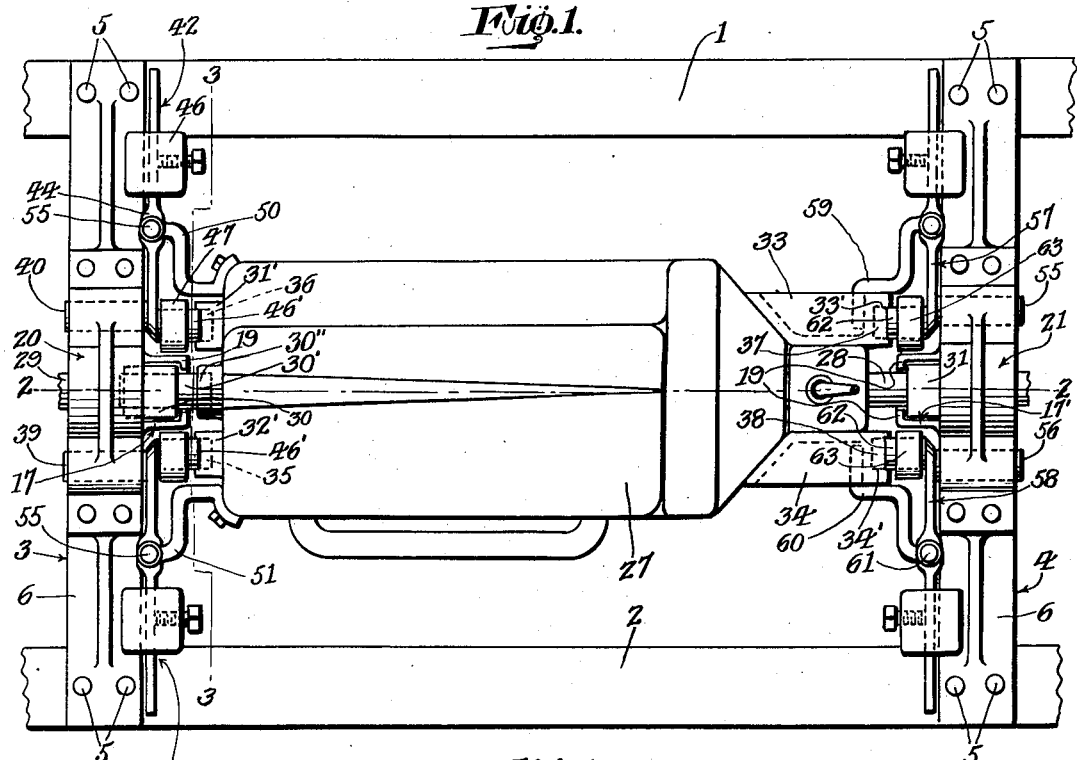
Figure 1 is a top view of a motor showing the adaptation therewith of the suspension therefor.

Referring to the drawings in detail, 1 and 2 denote the side bars of the chassis of an automotive vehicle and 3 and 4 indicate a pair of spaced parallel combined bearing forming and supporting members disposed transversely with respect to the chassis and anchored at their ends by the holdfast device 5 to the bars 1, 2.

The members 3, 4 are substantially of like construction and oppositely disposed with respect to each other, but the member 3 is of greater height than member 4. Each of said members includes a pair of endwise opposed, spaced oblong bottom plates 6 seating at their outer ends upon bars 1 and 2. Integral with the upper faces of plates 6 at the longitudinal medians thereof are oppositely disposed uprights 7, 8. The uprights of member 3 are of greater height than that of member 4. Each of the uprights consists of a horizontal and a vertical part 9, 10 respectively. The part 9 is of greater height than part 10 and the latter is arranged outwardly with respect to and merges at its inner end into the outer side edge of part 9 at the lower portion of the latter. The part 9 at its inner side edge merges into and centrally of the outer face of an upstanding portion 11 disposed at right angles to part 9. The portion 11 is integral at its lower end with the inner end of and is of the same width as the upper face of a plate 6. Integral with the top of part 9 and portion 11 and extending inwardly from the latter is a semi-circular bearing 12 formed with a laterally extending flange 13. The length of bearing 12 and the width of its flange 13 corresponds to the width of portion 11. The portion 9 has its upper edge merged into the lower face of bearing 12 transversely and centrally with respect to the length of the latter. The upper edge of portion 9 also merges into the flange 13 at the lengthwise median of the latter.

Figure 2:
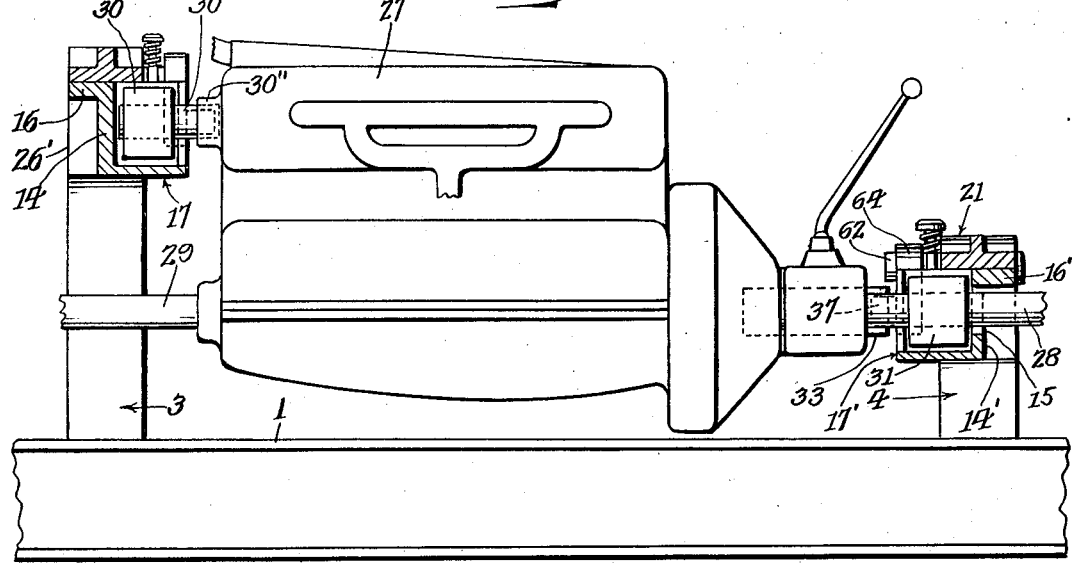
Figure 2 is a side elevation of the motor showing the adaptation therewith of the suspension therefor and with the latter illustrated in section in a direction lengthwise of the motor and upon line 2—2 Figure 1.

The members 3 and 4 include vertically disposed coupling portions 14, 14' respectively and each of which is integral with the opposed faces of the portions 11 centrally of such faces. The coupling portions merge into the lower faces of the bearings 12, bridge the spaces between portions 11 and are of less height than that of the latter. The portion 14' is formed with an opening 15. The portions 14, 14' have extending outwardly from their upper ends right angularly disposed flanges 16, 16' respectively (Figure 2). The ends of said flanges merge into the inner sides of the bearings 12. Formed integral with the inner faces of the coupling portions 14, 14' are vertically disposed U-shaped parts 17, 17' respectively which constitute boxings. The sides 18 of parts 17, 17' are formed with oppositely disposed inwardly extending flanges 19. Each boxing corresponds in height to that of the coupling portion from which it extends.

Cap pieces 20, 21 are mounted upon the top of members 3, 4 respectively and each of said pieces includes a pair of spaced inverted semi-circular bearings 22 which coact with the bearings 12 and are superimposed upon the latter. Each cap piece includes a coupling portion 23 between the bearings 22 and which is seated upon the top of coupling portion 14 or 14' and flange 16 or 16'. Each cap piece also includes a pair of flanges 24 seated upon the flanges 13. Each cap piece corresponds in width to that of a flange 13. The flanges of the cap pieces are secured to the flanges 13 by holdfast devices 25 and to the flanges 16 by the holdfast devices 26. A reinforcing web 26' is provided for coupling portion 14.

A motor is indicated at 27. The drive shaft of the vehicle at 28, and the crank shaft driven by the motor at 29. The motor 27 is suspended between the members 3, 4.

Mounted in the boxing provided by the U-shaped part 17 of member 3 and confined therein by the flanges 19 of such part is a vertically movable bearing block 30 through which extends a stub shaft 30'. The motor 27 centrally of the upper portion of its forward end is provided with a forwardly extending socket forming member 30" in which is seated the rear end of stub shaft 30'. Mounted in the boxing provided by the U-shaped part 17' of member 4 and confined therein by the flanges 19 of such part is a vertically movable bearing block 31 through which extends the drive shaft 28 of the vehicle.

The motor 27 at its forward end is provided with a pair of spaced parallel forwardly directed socket forming members 31', 32' between which member 30" is arranged in parallel spaced relation. Extending rearwardly from the rear end of motor 27 is a pair of spaced parallel arms 33, 34 provided at their rear ends with sockets 33', 34' respectively. Journaled in and extending forwardly from the socket forming members 31', 32' are pivots 35, 36 respectively. Journaled in and extending rearwardly from the sockets 33', 34' are pivots 37, 38 respectively.

Mounted in each of the bearings at the top of member 3 is a rearwardly extending suspension shaft. The shafts are indicated at 39, 40. Formed integral with the inner ends of the shafts 39, 40 are the inner ends of a pair of oppositely extending spring controlled weighted pivoting elements 41, 42 respectively and each consists of an arm 43 integral at the inner end of its forward side with the inner end of a shaft 39 or 40 and provided intermediate its ends with an enlarged portion 44 formed with a vertically disposed slot 45. Adjustably mounted on the arm 43 outwardly with respect to slot 45 is a counterweight 46. The inner end of the rear side of arm 43 is formed with a rearwardly extending stub shaft 46' offset inwardly with respect to a shaft 39 or 40. A hanger 47 in the form of a shackle depends from stub shaft 46'. The hanger 47 is formed with an opening 48 at its top for mounting on shaft 46' and it is also provided with an opening 49 at its bottom for connecting it to a pivot 35 or 36. Secured to the forward end of the motor is a pair of oppositely disposed forwardly extending brackets 50, 51. Each bracket has secured to its forward end a vertically disposed headed post 52 extending through the slot 45 in an arm 43. Mounted on the post 52 is a pair of coiled controlling springs 53, 54, one being interposed between the head 55 of post 52 and arm 43 and the latter being interposed between arm 43 and a securing means 56 which anchors the post 52 to the forward end of a bracket.

The elements 41, 42 in connection with the shafts 39, 40, pivots 35, 36, hangers 47, posts 52, shafts 46 and springs 53, 54 provide a two point suspension for the forward end of motor 27.

A two point suspension is provided for the rear end of motor 27 and which is set up of a series of elements corresponding in number to that of, of the same form as, arranged in the same co-related manner as and oppositely disposed with respect to the elements which provide the two point forward suspension. The two point rear suspension includes a pair of suspension shafts 55, 56 mounted in member 4 and integral with the inner end of the rear face of a pair of oppositely disposed spring controlled weighted pivoting elements 57, 58 respectively, a pair of oppositely disposed rearwardly extending brackets 59, 60 anchored with the rear end of the motor and having secured thereto vertical posts 61 which extend through the slots in the elements 57, 58, stub shafts 62 extending forwardly from the inner ends of elements 57, 58, and hangers 63 depending from shafts 62 and connected to the pivots 37, 38. The two point rear suspension includes a pair of controlling springs arranged in the same manner on each post 61 as the springs are arranged on each post 52 of the front or forward suspension. Only one of the upper controlling springs is shown with respect to the rear suspension and is indicated at 64.

The construction provides for a pair of spring controlled, counterbalanced oppositely disposed pivotally mounted suspension units for the forward end of the motor and a pair of spring controlled counterbalanced oppositely disposed suspension units for the rear end of the motor. The units function to eliminate motor shock and vibration to the vehicle. The slidable bearings function to overcome a jar or shock applied to the crank and drive shafts of the vehicle when placing the motor in operation and further assist in eliminating motor shock and vibration to the vehicle. The slidable bearings further act as a suspension means and to prevent side thrust of the motor.

The units function to take up any shock of the motor to the chassis thereby eliminating vibration of the latter. The units on one side counterbalance the units on the other side when the motor attempts to rock in either direction and act to maintain the motor on an even keel. When the motor moves upwardly or downwardly, the units move together and act to limit such movement and at the same time prevent the rocking of the motor in either direction.

A three point suspension can also be evolved by using only two units at one end and a shaft and bearing at the other.

What I claim is:

1. In a suspension for the motor of an automotive vehicle, the combination with the motor and the chassis of the vehicle, a front and a rear supporting member disposed transversely of and secured to said chassis and between which the motor is suspended, of a pair of oppositely extending spring controlled spaced counterbalanced suspension units pivotally supported at their inner ends from said front member and supported intermediate their ends from the forward end of the motor, and a pair of oppositely extending spring controlled spaced counterbalanced suspension units pivotally supported at their inner ends from said rear member and supported intermediate their ends from the rear end of the motor.

2. In a suspension for the motor of an automotive vehicle, the combination with the motor and the chassis of the vehicle, a front and a rear supporting member disposed transversely of and secured to said chassis and between which the motor is suspended, of a pair of oppositely extending spring controlled spaced counterbalanced suspension units pivotally supported at their inner ends from said front member and supported intermediate their ends from the forward end of the motor, a pair of oppositely extending spring controlled spaced counterbalanced suspension units pivotally supported at their inner ends from said rear member and supported intermediate their ends from the rear end of the motor, and each of said units including a vertically disposed post supported from the motor, extending through a pivoted slotted counterbalanced part of the unit and carrying a pair of controlling springs bearing against the upper and lower faces of such part.

3. In a suspension for the motor of an automotive vehicle, the combination with the motor and the chassis of the vehicle, a front and a rear supporting member disposed transversely of and secured to said chassis and between which the motor is suspended, of a pair of oppositely extending spring controlled spaced counterbalanced suspension units pivotally supported at their inner ends from said front member and supported intermediate their ends from the forward end of the motor, a pair of oppositely extending spring controlled spaced counterbalanced suspension units pivotally supported at their inner ends from said rear member and supported intermediate their ends from the rear end of the motor, each of said units including a vertically disposed post supported from the motor, extending through a pivoted slotted counterbalanced part of the unit and carrying a pair of controlling springs bearing against the upper and lower faces of such part, and each of said units including a vertically disposed shackle pivotally supported from said counterbalanced part and pivotally supported from the motor.

4. In a suspension for the motor of an automotive vehicle, the combination with the motor and chassis of the vehicle, a front and a rear supporting member disposed transversely of and secured to the chassis of the vehicle, the drive shaft of the vehicle, and a forwardly extending stub shaft at the forward end of the motor, of a pair of bearings, one for the stub shaft and the other for said drive shaft, the bearing for the stub shaft being arranged above the bearing for the drive shaft, said bearings being vertically movable and slidably mounted in said members, a pair of oppositely extending spring controlled spaced counterbalanced suspension units pivotally supported at their inner ends from said front member and supported intermediate their ends from the forward end of the motor, and a pair of oppositely extending spring controlled spaced counterbalanced suspension units pivotally supported at their inner ends from said rear member and supported intermediate their ends from the rear end of the motor.

5. In a suspension for the motor of an automotive vehicle, the combination with the motor and chassis of the vehicle, a front and a rear supporting member disposed transversely of and secured to the chassis of the vehicle, the drive shaft of the vehicle, and a forwardly directed stub shaft at the front of the motor, of a pair of bearings, one for the stub shaft and the other for said drive shaft, the bearing for the stub shaft being arranged above the bearing for the drive shaft, said bearings being vertically movable and slidably mounted in said members, a pair of oppositely extending spring controlled spaced counterbalanced suspension units pivotally supported at their inner ends from said front member and supported intermediate their ends from the forward end of the motor, a pair of oppositely extending spring controlled spaced counterbalanced suspension units pivotally supported at their inner ends from said rear member and supported intermediate their ends from the rear end of the motor, and each of said units including a vertically disposed part supported from the motor, extending through a slotted counterbalanced part of the unit and carrying a pair of controlling springs bearing against the upper and lower faces of such part.

6. In a suspension for the motor of an automotive vehicle, the combination with the motor and chassis of the vehicle, a front and a rear supporting member disposed transversely of and secured to the chassis of the vehicle, the drive shaft of the vehicle, and a forwardly directed stub shaft at the front end of the motor, of a pair of bearings, one for the forward end of the crank shaft and the other for said drive shaft, said bearings being vertically movable and slidably mounted in said members, the bearing for the stub shaft being arranged above the bearing for the drive shaft, a pair of oppositely extending spring controlled spaced counterbalanced suspension units pivotally supported at their inner ends from said front member and supported intermediate their ends from the forward end of the motor, a pair of oppositely extending spring controlled spaced counterbalanced suspension units pivotally supported at their inner ends from said rear member and supported intermediate their ends from the rear end of the motor, and each of said units including a vertically disposed shackle pivotally supported from said counterbalanced part and pivotally supported from the motor.

7. In a suspension for the motor of an automotive vehicle, the combination with the motor and the chassis of the vehicle, a front and a rear supporting member disposed transversely of and secured to said chassis and between which the motor is suspended, of a pair of oppositely extending spring controlled spaced counterbalanced suspension units pivotally supported at their inner ends from said front member and supported intermediate their ends from the forward end of the motor, a pair of oppositely extending spring controlled spaced counterbalanced suspension units pivotally supported at their inner ends from said rear member and supported intermediate their ends from the rear end of the motor, and each of said units including a spring controlled counterbalanced arm interposed between a supporting member and the motor having its inner end pivotally supported from such member and a hanger depending from said inner end and pivotally supported from the motor.

8. In a suspension for the motor of an automotive vehicle, the combination with the motor and chassis of the vehicle, a front and a rear supporting member disposed transversely of and secured to the chassis of the vehicle, the drive shaft of the vehicle, and a forwardly directed stub shaft at the front of the motor, of a pair of bearings, one for the forward end of the crank shaft and the other for said drive shaft, said bearings being vertically movable and slidably mounted in said members, a pair of oppositely extending spring controlled spaced counterbalanced suspension units pivotally supported at their inner ends from said front member and supported intermediate their ends from the forward end of the motor, a pair of oppositely extending spring controlled spaced counterbalanced suspension units pivotally supported at their inner ends from said rear member and supported intermediate their ends from the rear end of the motor, and each of said units including a spring controlled counterbalanced arm interposed between a supporting member and the motor having its inner end pivotally supported from such member and a hanger depending from said inner end and pivotally supported from the motor.

9. In a suspension for the motor of an automotive vehicle, the combination with the motor and chassis of the vehicle, and a front and a rear supporting member disposed transversely of and secured to the said chassis and between which the motor is suspended, of a pair of oppositely extending spaced counterbalanced forward suspension units positioned between the forward end of the motor and said forward member, said units including means at their inner ends for pivotally supporting them from said members, said units being pivotally connected below said means with the forward end of the motor, and a pair of oppositely extending spaced counterbalanced rear suspension units positioned between the rear end of the motor and said rear member, said rear units having means at their inner ends for pivotally supporting them from said rear member, and said rear units being pivotally connected below said means with the rear end of the motor.

10. In a suspension for the motor of an automotive vehicle, the combination with the motor and chassis of the vehicle, a front and a rear supporting member disposed transversely of and secured to said chassis and between which the motor is suspended, the drive shaft of the vehicle, and a stub shaft at the forward end of the motor, of a pair of vertically movable bearings, one for said stub shaft and the other for said drive shaft, said bearings being slidably mounted in said members, a pair of oppositely extending spaced counterbalanced forward suspension units positioned between the forward end of the motor and said forward member, said units including means at their inner ends for pivotally supporting them from said members, said units being pivotally connected below said means with the forward end of the motor, and a pair of oppositely extending spaced counterbalanced rear suspension units positioned between the rear end of the motor and said rear member, said rear units having means at their inner ends for pivotally supporting them from said rear member, and said rear units being pivotally connected below said means with the rear end of the motor.

11. In a suspension for the motor of an automotive vehicle, the combination with the motor and chassis of the vehicle, and a front and a rear supporting member disposed transversely of and secured to the said chassis and between which the motor is suspended, of a pair of oppositely extending spaced counterbalanced forward suspension units positioned between the forward end of the motor and said forward member, said units including means at their inner ends for pivotally supporting them from said members, said units being pivotally connected below said means with the forward end of the motor, a pair of oppositely extending spaced counterbalanced rear suspension units positioned between the rear end of the motor and said rear member, said rear units having means at their inner ends for pivotally supporting them from said rear member, said rear units being pivotally connected below said means with the rear end of the motor, and each of said units including a spring controlled counterbalanced arm interposed between a supporting member and the motor having its inner end pivotally supported from such member and a hanger depending from said inner end and pivotally supported from the motor.

12. In a suspension for the motor of an automotive vehicle, the combination with the motor and chassis of the vehicle, a front and a rear supporting member disposed transversely of and secured to said chassis and between which the motor is suspended, the drive shaft of the vehicle, and a stub shaft at the front end of the motor, of a pair of vertically movable bearings, one for said stub shaft and the other for said drive shaft, said bearings being slidably mounted in said members, a pair of oppositely extending spaced counterbalanced forward suspension units positioned between the forward end of the motor and said forward member, said units including means at their inner ends for pivotally supporting them from said members, said units being pivotally connected below said means with the forward end of the motor, a pair of oppositely extending spaced counterbalanced rear suspension units positioned between the rear end of the motor and said rear member, said rear units having means at their inner ends for pivotally supporting them from said rear member, said rear units being pivotally connected below said means with the rear end of the motor, and each of said units including a spring controlled counterbalanced arm interposed between a supporting member and the motor having its inner end pivotally supported from such member and a hanger depending from said inner end and pivotally supported from the motor.

13. In a suspension for the motor of an automotive vehicle, the combination with the motor and chassis of the vehicle, a front and a rear supporting member disposed transversely of and secured to said chassis and between which the motor is suspended, the drive shaft of the vehicle, and a stub shaft at the forward end of the motor, of a pair of vertically movable bearings, one for said stub shaft and the other for said drive shaft, said bearings being slidably mounted in said members, a pair of oppositely extending spaced counterbalanced forward suspension units positioned between the forward end of the motor and said forward member, said units including means at their inner ends for pivotally supporting them from said members, said units being pivotally connected below said means with the forward end of the motor, and a pair of oppositely extending spaced counterbalanced rear suspension units positioned between the rear end of the motor and said rear member, said rear units having means at their inner ends for pivotally supporting them from said rear member, and said rear units being pivotally connected below said means with the rear end of the motor, said front supporting member being of greater height than said rear supporting member, the said forward suspension units and the bearing for the stub shaft being arranged above the rear suspension units and said other bearing.

14. In a suspension for the motor of an automotive vehicle, the combination with the motor and chassis of the vehicle, and a front and a rear supporting member disposed transversely of and secured to the said chassis and between which the motor is suspended, of a pair of oppositely extending spaced counterbalanced forward suspension units positioned between the forward end of the motor and said forward member, said units including means at their inner ends for pivotally supporting them from said members, said units being pivotally connected below said means with the forward end of the motor, a pair of oppositely extending spaced counterbalanced rear suspension units positioned between the rear end of the motor and said rear member, said rear units having means at their inner ends for pivotally supporting them from said rear member, said rear units being pivotally connected below said means with the rear end of the motor, and each of said units including a spring controlled counterbalanced arm interposed between a supporting member and the motor having its inner end pivotally supported from such member and a hanger depending from said inner end and pivotally supported from the motor, the suspension units at one end of the motor being arranged above the other of said units.

In testimony whereof, I affix my signature hereto,

DAVID E. CARLSON.